(12) United States Patent
Samuel et al.

(10) Patent No.: US 11,023,220 B2
(45) Date of Patent: Jun. 1, 2021

(54) FIRMWARE UPDATE WITH INTEGRATED SMART SEQUENCE AND ACTION ENGINE

(71) Applicant: DELL PRODUCTS L.P., Round Rock, TX (US)

(72) Inventors: Balasingh P. Samuel, Round Rock, TX (US); Zhaohui Yu, Cedar Park, TX (US); Bibby Yeh, Taoyuan (TW)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/584,138

(22) Filed: Sep. 26, 2019

(65) Prior Publication Data

US 2021/0096838 A1 Apr. 1, 2021

(51) Int. Cl.
*G06F 8/65* (2018.01)
*G06F 21/57* (2013.01)
*G06F 9/4401* (2018.01)

(52) U.S. Cl.
CPC .............. *G06F 8/65* (2013.01); *G06F 9/4401* (2013.01); *G06F 21/572* (2013.01)

(58) Field of Classification Search
None
See application file for complete search history.

(56) References Cited

U.S. PATENT DOCUMENTS

| | | | |
|---|---|---|---|
| 5,974,256 A * | 10/1999 | Matthews | G06F 8/41 717/118 |
| 8,594,850 B1 | 11/2013 | Gourlay et al. | |
| 9,410,712 B2 | 8/2016 | Smith et al. | |
| 9,620,173 B1 | 4/2017 | Fay et al. | |
| 2005/0166213 A1* | 7/2005 | Cromer | H04L 41/26 719/315 |
| 2006/0026590 A1* | 2/2006 | Berenberg | G06F 8/656 717/175 |
| 2006/0200672 A1* | 9/2006 | Calhoon | G06F 21/16 713/176 |
| 2009/0006834 A1* | 1/2009 | Rothman | G06F 8/65 713/2 |
| 2009/0144534 A1* | 6/2009 | Calhoon | H04L 9/0662 713/2 |
| 2012/0084552 A1* | 4/2012 | Sakthikumar | G06F 9/4812 713/100 |

(Continued)

FOREIGN PATENT DOCUMENTS

| CN | 1632749 | 6/2005 |
|---|---|---|
| CN | 102081534 | 9/2015 |

(Continued)

*Primary Examiner* — Qing Chen
(74) *Attorney, Agent, or Firm* — Jackson Walker LLP; Christopher J. Rourk

(57) ABSTRACT

A system for sequencing firmware updates comprising a sequenced payload creation system operating on a processor and configured to receive two or more firmware payload sets and to generate a payload sequence for the two or more firmware payload sets. A BIOS payload system operating on the processor and configured to receive the two or more firmware payload sets and the payload sequence and to generate a basic input/output system (BIOS) payload. A BIOS locking system operating on the processor and configured to receive the BIOS payload and to generate a secure BIOS executable.

20 Claims, 2 Drawing Sheets

(56) References Cited

U.S. PATENT DOCUMENTS

| | | | |
|---|---|---|---|
| 2013/0125107 A1* | 5/2013 | Bandakka | G06F 11/1448 |
| | | | 717/171 |
| 2013/0191624 A1* | 7/2013 | Jarmay | G06F 12/1433 |
| | | | 713/2 |
| 2015/0279366 A1 | 10/2015 | Krestnikov et al. | |
| 2016/0202964 A1* | 7/2016 | Butcher | G06F 8/65 |
| | | | 717/172 |
| 2016/0291966 A1 | 10/2016 | Johnson | |
| 2017/0010875 A1* | 1/2017 | Martinez | G06F 21/575 |
| 2019/0042752 A1* | 2/2019 | Mihm | G06F 21/572 |
| 2019/0080252 A1 | 3/2019 | Shinn et al. | |
| 2019/0163497 A1* | 5/2019 | Samuel | G06F 9/4411 |
| 2020/0082090 A1* | 3/2020 | Samuel | G06F 21/64 |
| 2020/0341744 A1* | 10/2020 | Suryanarayana | G06F 13/1668 |
| 2020/0356357 A1* | 11/2020 | Narasimhan | G06F 9/4401 |

FOREIGN PATENT DOCUMENTS

| | | |
|---|---|---|
| CN | 105706469 A | 6/2016 |
| KR | 20150079885 A | 7/2015 |

* cited by examiner

FIGURE 1    100

FIRMWARE UPDATE WITH INTEGRATED SMART SEQUENCE AND ACTION ENGINE

TECHNICAL FIELD

The present disclosure relates generally to firmware installation and more specifically to a system and method for firmware updates that uses an integrated smart sequence and action engine.

BACKGROUND OF THE INVENTION

Installing an update to firmware is performed as part of a processor reboot, but can involve numerous problems that are not solved by the prior art.

SUMMARY OF THE INVENTION

A system for sequencing firmware updates is disclosed that includes a sequenced payload creation system operating on a processor and configured to receive two or more firmware payload sets and to generate a payload sequence for the two or more firmware payload sets. A BIOS payload system operating on the processor is configured to receive the two or more firmware payload sets and the payload sequence and to generate a basic input/output system (BIOS) payload. A BIOS locking system operating on the processor is configured to receive the BIOS payload and to generate a secure BIOS executable.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
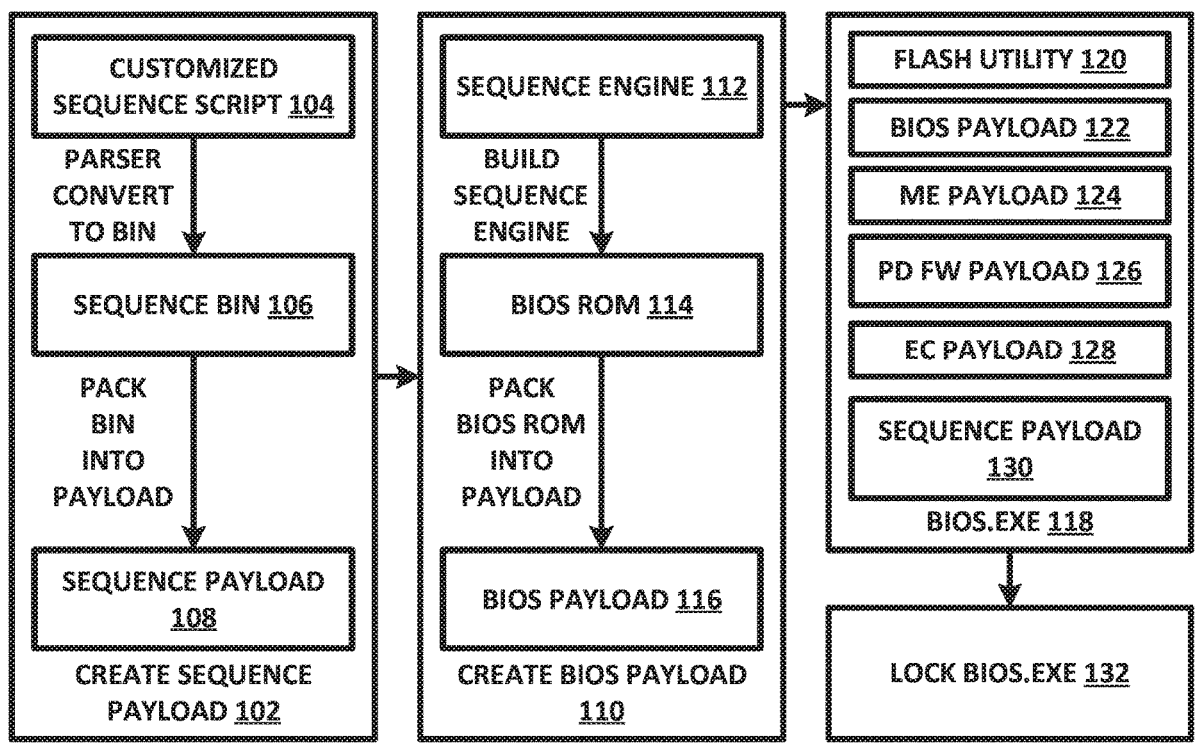
FIG. 1 is a diagram of a system for creating and deploying a sequence engine, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A number of computer system components have updatable firmware, including the basic input-output system (BIOS), the embedded controller (EC), the manageability engine (ME) and power delivery (PD). In addition to the increase in complexity resulting from these multiple firmware components, a predetermined sequence may need to be followed for updates to the firmware. This complexity is further increased if a sequence changes between the different BIOS or firmware versions on the same platform. In certain cases, processor system actions such as setting up a general purpose input/output system or an ME reset are required between device firmware component updates.

In those scenarios, a user may first be instructed to update a transition BIOS and then a subsequent BIOS revision. A special BIOS release might also or alternatively be created for those platforms. But deploying a transition BIOS or a special customized BIOS can require a higher overhead for developers, technicians, QA/validation personnel and other personnel. In addition, customer satisfaction can be adversely affected, and an increase in service call volumes can occur when a transition BIOS or special customized BIOS is deployed. These processes can result in the imposition of real costs to implement BIOS upgrades.

The present disclosure provides a combination of a sequence payload and a smart sequence engine to control firmware payload update order, and to apply predetermined actions during or in-between the firmware update process. The sequence payload can be provided in script form, and the sequence engine can be a specialized update driver (such as a Capsule Driver Execution Environment (DXE) driver) that is delivered by a firmware update utility (such as Windows Update (WU)/Linus Vendor Firmware Service (LVFS)) along with the sequence payload and other firmware payloads. Both the sequence payload and sequence engine can be signed and protected using an RSA key pair for additional security, where the sequence payload is serviced by the sequence engine.

The present disclosure provides a highly scalable data driven model to simplify and automate a complex firmware update process, and to address payload dependency or flash map related issues. In one example embodiment, a firmware build process can be used. First, a BIOS owner can create a flash update sequence script, such as in extensible markup language (XML), JavaScript Object Notation (JSON) or other suitable readable formats. A BIOS post build parser utility can convert the update sequence script to a binary file. The sequence engine (such as a DXE driver) can also be created as a function of the installation sequence requirements. The sequence engine driver can be generic, as it is driven by the sequence payload (data driven model). In addition, a sequence engine can be customized if necessary. The sequence engine and sequence payload file can be signed using RSA keys or other suitable security mechanisms can be used to ensure that the sequence engine and sequence payload file are protected from malicious actors. A binary file can then be created that includes the sequence payload and sequence engine with a BIOS executable file, and all targeted and dependency payloads can be appended to the BIOS executable.

In another example embodiment, a firmware update process can be implemented that includes delivering firmware payloads with a sequence engine and sequence payload to a BIOS using a flash update utility (or WU/LVFS). The system BIOS can receive all of the payloads, such as via system RAM, other temporary storage or in other suitable manners. The system BIOS can authenticate the payload data, and can load the sequence engine and execute. The sequence engine can then process the sequence payload. Firmware payloads can be updated based on an order defined in the sequence payload. In addition, predetermined actions (such as setting the GPIO and resetting the ME) can also be executed. If predetermined device firmware updates require an intermediate reboot, then the payloads can be saved in a temporary storage, such as a capsule in memory or the Extensible Firmware Interface (EFI) System Partition of the hard drive. The temporary copy can be deleted after the flash process is completed.

The present disclosure provides numerous technical features. One technical feature is the use of a data driven model to manage firmware update sequence and to define new actions. The transition and new firmware can be updated in the same boot session without booting to OS multiple times. Booting to full OS with intermediate or incomplete firmware update can cause reduced security by introducing an attack vector that can be exploited by a malicious actor. In addition, the sequence payload can be signed using an existing BIOS signing infrastructure, which can protect such payloads from malicious software because it cannot change the firmware update sequence.

The present disclosure thus avoids the need for multiple BIOS and complicated instruction sets to be given to the end users to update firmware in the case where a transition BIOS would otherwise be required. Instead, a data driven model is used to simplify the update process.

While it is possible to add a sequence by manipulating the EFI System Resource Table (ESRT) Globally Unique Identifier (GUID) to deploy firmware via WU and LVFS, this procedure cannot be used for flash update executable files and other services. In addition, there are no actions that can be added during or in-between firmware update processes in this manner, and maintaining and managing the ESRT GUID for each system is a manual process.

The present disclosure provides a sequence engine that can be used to fix problems that are identified after a product has been shipped, and thus can reduce the cost compared to a manual transition BIOS solution. The present disclosure provides an automatic process that does not require any customer interaction, and reduces service calls and human error. The disclosed sequence engine can be used for suitable firmware deployment services.

FIG. 1 is a diagram of a system 100 for creating and deploying a sequence engine, in accordance with an example embodiment of the present disclosure. System 100 includes create sequence payload 102, customized sequence script 104, sequence bin 106, sequence payload 108, create BIOS payload 110, sequence engine 112, BIOS ROM 114, BIOS payload 116, BIOS.EXE 118, flash utility 120, BIOS payload 122, ME payload 124, PD FW payload 126, EC payload 128, sequence payload 130 and lock BIOS.EXE 132, each of which can be implemented in hardware or a suitable combination of hardware and software.

In one example embodiment, system 100 can be implemented in part using an editing tool that generates a user display and associated controls for controlling one or more of the components of system 100. For example, system 100 can include a user interface that implements the functional elements of system 100, such as by creating one or more user interface windows with user-selectable fields, where the user can enter or modify code that is used to create a BIOS executable file. The structure and sequence of user interface actions is used to control the creation of firmware for sequencing, so as to ensure that firmware updates occur in the manner and sequence required to avoid misoperation. In this regard, system 100 can be implemented on one or more processors using a user interface device such as a screen display and user-selectable controls, such as controls that are selected using a mouse or other selection device and by further selecting one or more control actions, such as from a pull-down menu, with a subsequent mouse selection, with a touch screen selection, with a voice control or in other suitable manners.

Create sequence payload 102 generates a user interface and associated controls to create a sequence payload. In one example embodiment, create sequence payload 102 can include one or more algorithms that are implemented on a processor to generate a user interface that allows a BIOS owner, such as a user that has access to BIOS algorithmic code, to update a sequence script. The algorithms can generate user interface controls that allow a user to navigate between customized sequence script 104, sequence bin 106 and sequence payload 108, to load previous versions of BIOS algorithmic code, to save new versions of BIOS algorithmic code and to perform other suitable functions.

Customized sequence script 104 can include one or more algorithms that are implemented on a processor to generate a user interface that allows a BIOS owner, such as a user that has access to BIOS algorithmic code, to open a previous version of BIOS algorithmic code, to write a new version of BIOS algorithmic code, to import a BIOS algorithmic code file, to use a selection tool to select tool kit components for BIOS algorithmic code or to perform other suitable functions. In one example embodiment, customized sequence script 104 can allow a user to save a draft of a revised BIOS algorithmic code file, to annotate the BIOS algorithmic code file to allow another user to access and modify the file, or to perform other suitable functions. Customized sequence script 104 can include a control to activate a parser that converts the algorithmic code of customized sequence script 104 into a binary (BIN) file, such as by using a BIOS post build parser, and other suitable controls.

Sequence bin 106 can include one or more algorithms that are implemented on a processor to generate a user interface that allows a user to activate a sequence engine such as a DXE driver to pack the BIN file into a payload data structure. In one example embodiment, the payload data structure can be configured as a function of a read only memory (ROM) device configuration, where the payload data structure is stored on the ROM device using a flash utility or in other suitable manners.

Sequence payload 108 can include one or more algorithms that are implemented on a processor to generate a user interface that configures the payload data structure for processing by a sequence engine. In one example embodiment, sequence payload 108 allows a user to identify a sequence in which a firmware payload should be installed on a processor, to generate variables that can be read during the installation process to identify the sequence and to perform other suitable functions.

Create bios payload 110 can include one or more algorithms that are implemented on a processor to generate a user interface that creates a BIOS payload with a sequence engine. In one example embodiment, create BIOS payload 110 can receive a plurality of firmware, BIOS or other suitable algorithmic data structures and can create the BIOS payload with the sequence engine using those algorithmic data structures.

Sequence engine 112 can include one or more algorithms that are implemented on a processor to generate a user interface that allows a user to build a sequence engine driver into a BIOS. In one example embodiment, sequence engine 112 can be configured to identify specific sequence components, to install the sequence components in a predetermined order, to generate predetermined user interface displays that inform the user of an intermediate update status, and to perform other suitable functions.

BIOS ROM 114 can include one or more algorithms that are implemented on a processor to generate a user interface that allows a user to pack a BIOS ROM into a payload. In one example embodiment, BIOS ROM 114 can receive BIOS, firmware and other suitable algorithmic data structures and can pack the BIOS ROM into a payload in a predetermined manner, in response to user commands or in other suitable manners.

BIOS payload 116 can include one or more algorithms that are implemented on a processor to generate a user interface that allows a user to append all payload logic structures for a BIOS executable file. In one example embodiment, the payload logic structures can include firmware or other suitable algorithmic data structures.

BIOS.EXE 118 can include one or more algorithms that are implemented on a processor to generate a user interface that generates an executable file that installs a BIOS algorithmic data structure in a processor memory device.

Flash utility 120 can include one or more algorithms that are implemented on a processor to generate a user interface that store BIOS data to a ROM memory. In one example, embodiment, flash utility 120 can be used to save, manage and update a motherboard BIOS. Flash utility 120 can be configured to save a current BIOS file of algorithmic data structures, to download a latest version of the BIOS algorithmic data structures, to update the BIOS algorithmic data structures, to view the BIOS algorithmic data structures and to perform other suitable functions.

BIOS payload 122 can include one or more algorithms that are implemented on a processor to control a basic input/output system of a processor. In one example embodiment, the algorithms can specify different versions of the basic input/output system, an installation order or sequence for the different versions, an installation order or sequence for each version relative to other firmware or other suitable data.

ME payload 124 can include one or more algorithms that are implemented on a processor to control a manageability engine system of a processor. In one example embodiment, the algorithms can specify different versions of the manageability engine system, an installation order or sequence for the different versions, an installation order or sequence for each version relative to other firmware or other suitable data.

PD FW payload 126 can include one or more algorithms that are implemented on a processor to control a power delivery system of a processor. In one example embodiment, the algorithms can specify different versions of the power delivery system, an installation order or sequence for the different versions, an installation order or sequence for each version relative to other firmware or other suitable data.

EC payload 128 can include one or more algorithms that are implemented on a processor to control an embedded controller system of a processor. In one example embodiment, the algorithms can specify different versions of the embedded controller system, an installation order or sequence for the different versions, an installation order or sequence for each version relative to other firmware or other suitable data.

Sequence payload 130 can include one or more algorithms that are implemented on a processor to control a payload sequence for a BIOS executable file. In one example embodiment, the algorithms can control the identification and sequencing of different versions of the basic input/output system, the manageability engine system, the power delivery system, the embedded controller system and other systems, an installation order or sequence for the different systems, an installation order or sequence for each system relative to other systems or other suitable data.

Lock BIOS.EXE 132 can include one or more algorithms that are implemented on a processor to secure the BIOS.EXE file for delivery to processors. In one example embodiment, a security process that uses a unique signature file to encrypt the BIOS.EXE file can be used to reduce the risk that a BIOS.EXE file could be obtained by a malicious actor and used to provide a corrupted BIOS.EXE file to users.

In operation, system 100 allows a BIOS and other firmware to be configured to allow a specific sequence of events to be implemented as part of a BIOS/firmware update process. System 100 provides numerous substantial technical features by creating a system for sequencing BIOS and firmware, for packaging the sequenced BIOS and firmware and for delivering the sequenced and packaged BIOS and firmware to users in a secure format.

Figure 2:
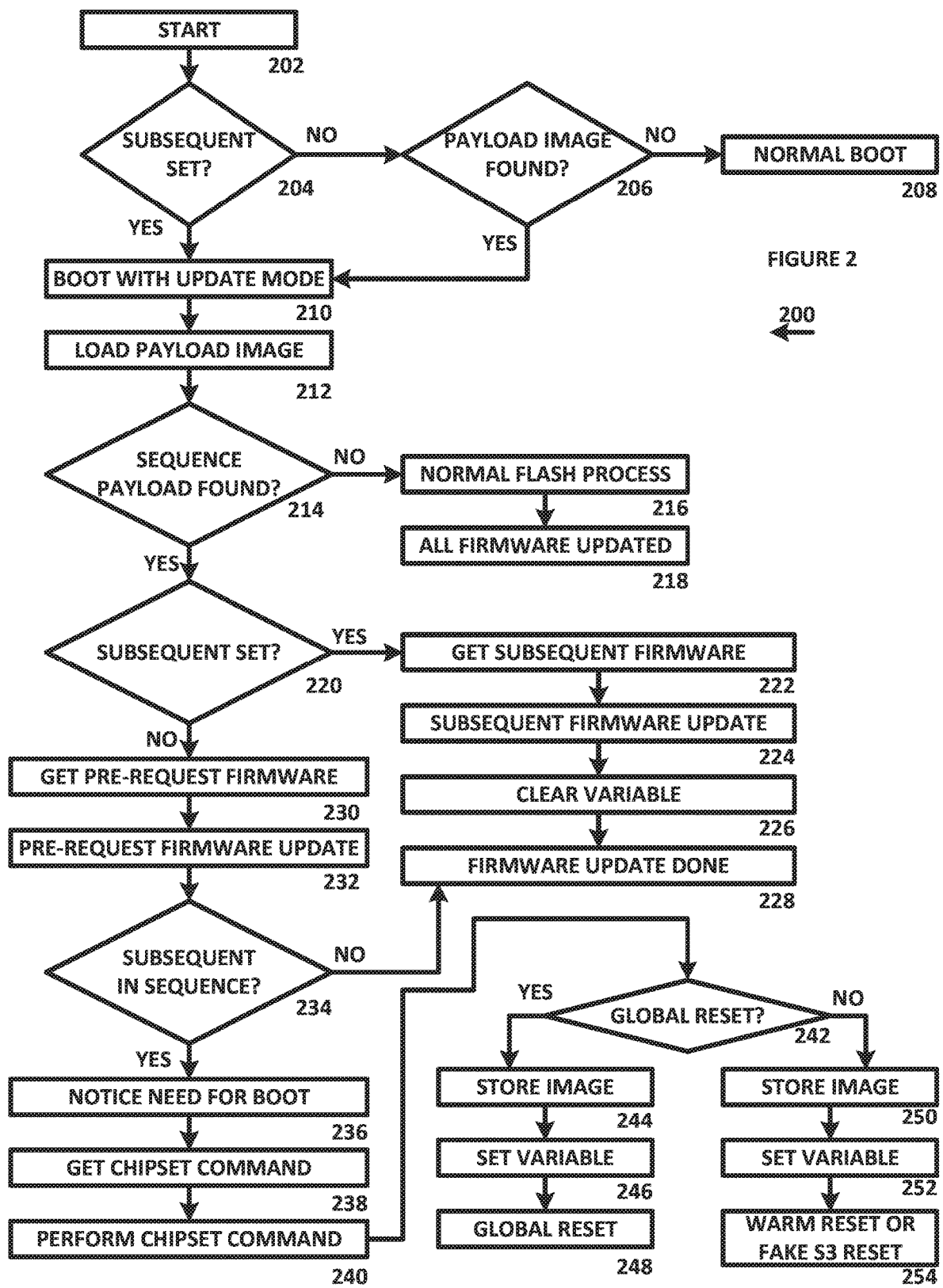
FIG. 2 is a diagram of an algorithm for creating and deploying a sequence engine, in accordance with an example embodiment of the present disclosure.

FIG. 2 is a diagram of an algorithm 200 for creating and deploying a sequence engine, in accordance with an example embodiment of the present disclosure. Algorithm 200 can be implemented in hardware or a suitable combination of hardware and software, and can include firmware created for a first processor by one or more additional processors.

Algorithm 200 begins at 202, where a firmware update process is initiated. In one example embodiment, the firmware update process can be initiated as part of a standard processor boot cycle, when the processor is started from a cold start, is restarted for the purpose of installing software updates or for other suitable purposes. The firmware update can be initiated as part of a configuration setting of the processor hardware that checks for firmware updates or other changes, or in other suitable manners. The algorithm then proceeds to 204.

At 204, it is determined whether a subsequent set of firmware is available. For example, a variable that represents the presence of a subsequent set of firmware, such as a when a new firmware image has been stored in a ROM memory, can be checked as part of a configuration setting of the processor hardware or in other suitable manners. If no subsequent set of firmware is available, the algorithm proceeds to 206, otherwise the algorithm proceeds to 210.

At 206, it is determined whether a payload image has been found. In one example embodiment, a firmware update can be implemented using a payload image, such as a payload image in a firmware update capsule or in other suitable manners. If no payload image has been found, then the algorithm proceeds to 208, where a normal boot process is implemented, otherwise the algorithm proceeds to 210.

At 210, the processor boot process is started in an update mode, such as a BOOT_ON_FLASH_UPDATE mode or in other suitable manners. In one example embodiment, the update mode can be part of a configuration setting of the processor hardware that performs predetermined steps in a firmware update mode, or in other suitable manners. The algorithm then proceeds to 212.

At 212, the payload image is loaded. In one example embodiment, the payload image can be loaded from a firmware update capsule, from an EFI System Partition (ESP) or in other suitable manners. The algorithm then proceeds to 214.

At 214, it is determined whether payload sequence data has been found in the payload image. In one example embodiment, the payload sequence data can be stored in a predetermined field of a firmware update capsule or in other suitable manners. If it is determined that sequence data has not been found, then the algorithm proceeds to 216, otherwise the algorithm proceeds to 220.

At 216, a normal flash process is used to update the firmware. In one example embodiment, the normal flash process can include one or more algorithms that are part of a processor hardware configuration or other suitable algorithms. The algorithm then proceeds to 218 and terminates after all firmware has been updated.

At 220, it is determined whether there is a subsequent set of firmware. In one example embodiment, a variable that indicates the presence of a subsequent set of firmware can be checked, such as by checking one or more predetermined data fields of a firmware update capsule or in other suitable manners. If it is determined that there is a subsequent set of firmware, the algorithm proceeds to 222, otherwise the algorithm proceeds to 222.

At 222, the subsequent set of firmware is obtained. In one example embodiment, a list of subsequent firmware update blocks, files or other logical structures can be obtained from a sequence payload structure, or other suitable processes can also or alternatively be used. The algorithm then proceeds to 224.

At 224, the subsequent set of firmware is updated. In one example embodiment, the list of subsequent firmware update blocks, files or other logical structures can be used to identify and obtain the firmware from a payload data structure, or other suitable processes can also or alternatively be used. The algorithm then proceeds to 226.

At 226, a variable that is used to flag that a subsequent set of firmware exists is cleared. In one example embodiment, the variable can be set in the ESP or in other suitable manner. The algorithm then proceeds to 228, where the firmware update process is completed.

At 230, a pre-request firmware list is obtained. In one example embodiment, a pre-request list of firmware update blocks, files or other logical structures can be obtained from a sequence payload structure, or other suitable processes can also or alternatively be used. The algorithm then proceeds to 232.

At 232, the pre-request firmware is updated. In one example embodiment, the list of pre-request firmware update blocks, files or other logical structures can be used to identify and obtain the firmware from a payload data structure, or other suitable processes can also or alternatively be used. The algorithm then proceeds to 234.

At 234, it is determined whether a subsequent firmware list is present in a sequence payload. If the subsequent firmware list is not present, the algorithm proceeds to 228 where the firmware update is completed, otherwise the algorithm proceeds to 236.

At 236, a notice is generated for the user that a subsequent firmware update will be performed on the next reboot. In one example embodiment, the user interface display can be paused during the boot process, and a user interface message can be generated if it is determined that a subsequent firmware list is present in a sequence payload, or in other suitable manners. The algorithm then proceeds to 238.

At 238, a chipset command is obtained. In one example embodiment, a chipset command list can be obtained from a sequence payload, or other suitable processes can also or alternatively be used. The algorithm then proceeds to 240.

At 240, the chipset command or commands is/are performed. In one example embodiment, the chipset commands can be included in a chipset driver that is loaded from a memory device or in other suitable manners. The algorithm then proceeds to 242.

At 242, it is determined whether a global reset is required. If a global reset is required, the algorithm proceeds to 244, otherwise the algorithm proceeds to 250.

At 244, the payload image is stored. In one example embodiment, the payload image can be stored in a predetermined data memory device, such as a data memory device associated with ESP or in other suitable manners. The algorithm then proceeds to 246.

At 246, a subsequent variable is set. In one example embodiment, the subsequent variable can be set in a predetermined data memory device, such as a data memory device associated with ESP or in other suitable manners. The algorithm then proceeds to 248.

At 248, a global reset is performed, and the boot process continues with the global reset.

At 250, the payload image is stored. In one example embodiment, the payload image can be stored in a predetermined data memory device, such as a data memory device associated with ESP or in other suitable manners. The algorithm then proceeds to 252.

At 252, a subsequent variable is set. In one example embodiment, the subsequent variable can be set in a predetermined data memory device, such as a data memory device associated with ESP or in other suitable manners. The algorithm then proceeds to 254.

At 254, a fake S3 reset is performed, and the boot process continues with the fake S3 reset.

In operation, algorithm 200 allows a sequence of firmware updates to be implemented on a processor. Although algorithm 200 is shown as a flow chart, it can also or alternatively be implemented as a state diagram, a ladder diagram, using object-oriented programming or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for sequencing firmware updates comprising:
a processor;
a sequenced payload creation system operating on the processor and configured to receive two or more firmware payload sets and to generate a payload sequence for the two or more firmware payload sets;
a BIOS payload system operating on the processor and configured to receive the two or more firmware payload sets and the payload sequence, to generate a basic input/output system (BIOS) payload, and to generate a user interface that identifies specific sequence components and that installs the specific sequence components in a predetermined order into the BIOS payload; and
a BIOS locking system operating on the processor and configured to receive the BIOS payload and to generate a secure BIOS executable.

2. The system of claim 1 wherein the sequenced payload creation system further comprises one or more algorithms for generating a user interface control to implement a parser to convert a customized sequence script to a binary file.

3. The system of claim 1 wherein the sequenced payload creation system further comprises one or more algorithms for generating a user interface control to pack a sequenced binary file into a payload for delivery to a second processor and installation at the second processor.

4. The system of claim 1 wherein the BIOS payload system further comprises one or more algorithms for generating a user interface control to build a sequence engine driver for a BIOS payload and a sequence engine.

5. The system of claim 1 wherein the BIOS payload system further comprises one or more algorithms for generating a user interface control to pack a BIOS ROM into a payload.

6. The system of claim 1 wherein the BIOS locking system generates the secure BIOS executable by encrypting the BIOS payload using a unique encryption key.

7. The system of claim 1 wherein the sequenced payload creation system is further configured to receive a customized sequence script and to parse the customized sequence script to generate a binary file.

8. The system of claim 1 wherein the sequenced payload creation system is further configured to generate a user interface to allow a user to select predetermined tool kit components for use with BIOS code.

9. The system of claim 1 wherein the BIOS payload system is further configured to generate a user interface that identifies specific sequence components, that informs a user of an intermediate update status, and that installs the specific sequence components in a predetermined order into the BIOS payload.

10. The system of claim 1 wherein the BIOS locking system is further configured to receive the BIOS payload and a sequence payload and to generate a secure BIOS executable that includes the BIOS payload and the sequence payload.

11. The system of claim 1 wherein the BIOS locking system is further configured to receive the BIOS payload, a manageability engine payload, and a sequence payload and to generate a secure BIOS executable that includes the BIOS payload, the manageability engine payload, and the sequence payload.

12. The system of claim 1 wherein the BIOS payload system further comprises one or more algorithms for generating a user interface control to pack a BIOS ROM into a payload and wherein the BIOS locking system generates the secure BIOS executable by encrypting the BIOS payload using a unique encryption key.

13. The system of claim 1 wherein the sequenced payload creation system is further configured to receive a customized sequence script and to parse the customized sequence script to generate a binary file and to generate a user interface to allow a user to select predetermined tool kit components for use with BIOS code.

14. A method for installing sequenced firmware on a processor comprising:
   loading a payload image from a data memory device;
   determining whether a sequence indicator is present within the payload image;
   updating two or more firmware payload sets using a sequence associated with the sequence indicator present within the payload image; and
   receiving a chipset command from data of the payload image after requesting a subsequent set of firmware and determining that the subsequent set of firmware is present in a sequence payload.

15. The method of claim 14 wherein loading the payload image from the data memory device comprises loading the payload image from the data memory device after receiving and storing the payload image from a payload image sequencing system.

16. The method of claim 14 wherein loading the payload image from the data memory device comprises:
   entering an update mode when the payload image is found;
   loading the payload image from the data memory device; and
   booting normally when the payload image is not found.

17. The method of claim 14 wherein determining whether the sequence indicator is present within the payload image comprises determining whether the sequence indicator is present in a predetermined location within the payload image.

18. The method of claim 14 wherein determining whether the sequence indicator is present within the payload image further comprises determining whether a subsequent set of firmware is available.

19. The method of claim 18 further comprising obtaining the subsequent set of firmware.

20. The method of claim 14 further comprising receiving a chipset command from data of the payload image.

* * * * *